J. R. ANTHONY.
FERTILIZER DISTRIBUTER.
No. 10,706. Reissued Apr. 6, 1886.
Fig. 1
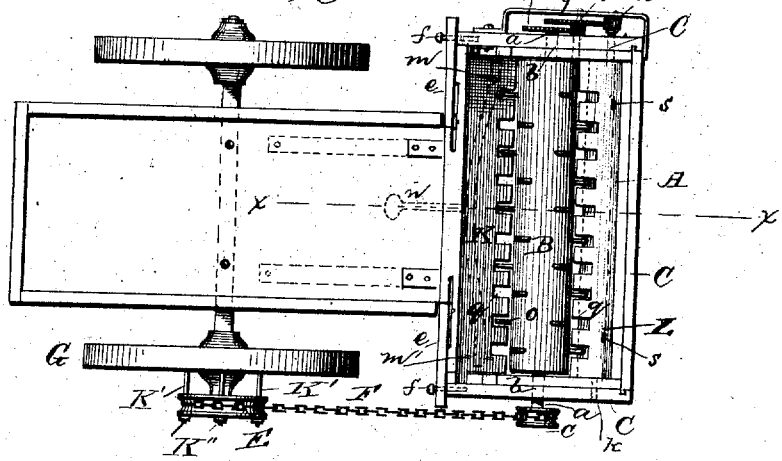
Fig. 2.
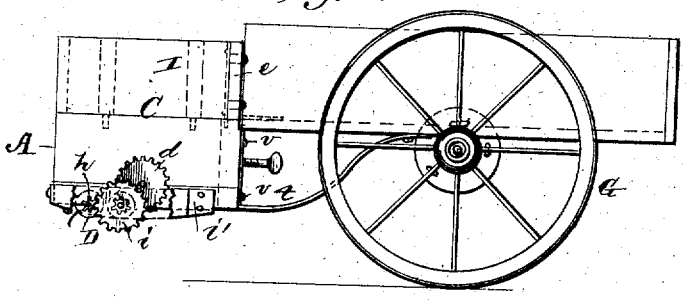
Fig. 4
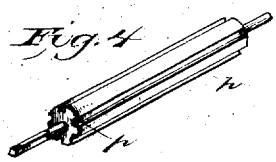
Fig. 3.
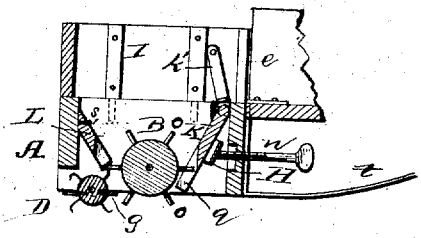
Fig. 5
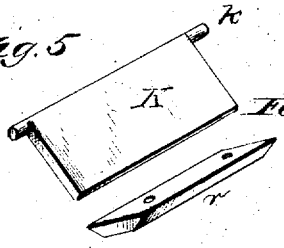
Fig. 6
WITNESSES
L. L. Durand
E. M. Johnson
John R. Anthony
INVENTOR
Attorney

UNITED STATES PATENT OFFICE.

JOHN RUSSELL ANTHONY, OF SHERMAN CITY, KANSAS.

FERTILIZER-DISTRIBUTER.

SPECIFICATION forming part of Reissued Letters Patent No. 10,706, dated April 6, 1886.

Original No. 278,483, dated May 29, 1883. Application for reissue filed December 10, 1885. Serial No. 185,311.

*To all whom it may concern:*

Be it known that I, JOHN RUSSELL ANTHONY, a citizen of the United States, residing at Sherman City, in the county of Cherokee and State of Kansas, have invented certain new and useful Improvements in Fertilizer-Distributers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to provide a manure-distributer which is so constructed that it may be attached to an ordinary wagon or cart, said distributer being adapted to be operated, in connection with said wagon or cart, so as to equally and evenly distribute manure, fertilizers, or other substances over the surface of the ground.

My invention consists in the construction and in the combination of the parts, as will be hereinafter set forth.

In the accompanying drawings, forming a part of this specification, Figure 1 is a top view of my improved fertilizer-distributer, showing the same attached to a cart or wagon. Fig. 2 is a side elevation. Fig. 3 is a transverse section taken through the line *x x* of Fig. 1. Fig. 4 is a perspective view of a modification of the main cylinder. Fig. 5 is a detail perspective view of the inclined boards which are pivoted in the receptacle which carries the fertilizer. Fig. 6 is a perspective view of a beveled-edge slat which is held in place behind the cylinder by screws.

A represents a frame or receptacle, which is constructed with four sides, so as to form an oblong box of the desired depth, in the bottom of which is journaled the cylinder B. The cylinder B is provided at its ends with journals *a a'*, which work in bearings *b b*, one of said journals being extended and carrying at its outer end a pulley or wheel, *c*, the opposite journal also being extended and provided with a cog-wheel, *d*. The top of the frame A is provided with side boards C C C, and with movable or adjustable side boards *e e*, which are provided with slots in which screws are driven at *f f*, so that the opening may be widened or narrowed to suit the width of the wagon-box. It will be noticed that the length of the cylinder B is the same as the distance between the outer edges of the tires of the wheel, so that the fertilizer will be distributed between the tread of the cart or wagon, and that the furrows made by the wheels will serve as guides in moving the apparatus across the field. A tooth-cylinder, D, is attached to the under edge of the box or receptacle A, and this cylinder is provided with gudgeons *g g*, by means of which said cylinder is journaled to the box, one of said gudgeons being provided with a pinion or cog wheel, *h*, with which meshes the cog-wheel *i*, which is journaled to the frame and provided with a pinion with which meshes the cog-wheel *d*. Thus the toothed cylinder D is caused to rotate at a much greater rate of speed than the feeding-cylinder B. A band, *i'*, is attached to the side of the frame A and forms bearings for the ends of the gudgeons *g* and the shaft of the pinion *i*. The driving-pulley *c*, which is located on the end of the shaft of the cylinder B, is connected to the driving-pulley E by a band, belt, or chain, F. Said driving-pulley, which is indicated by the letter E, is attached firmly to the wagon or cart wheel by three or more hook-bolts, K', the hooks of which catch on the spokes of the wheel G, while the straight ends of the bolts pass through the pulley E, the ends of said bolts being provided with screws and nuts, so that when the nuts K'' are screwed down the bolts will be tightened and the pulley forced against the outer edge of the hub, so as to hold said pulley firmly in position. This construction adapts the pulley to be taken off when the fertilizer-distributing attachment is to be removed.

K represents a pivoted board or slat which is adapted to fit and play between the end pieces of the fertilizer-receptacle A, the projections or journals *k* at the upper end thereof fitting into recesses formed in the upper edges of the box A, said boards being held in position against vertical movement by a turn-button, *k'*, pivoted to the supplemental frame or hopper I. This pivoted board is provided on its rear side with a spring, H, which is fastened thereto at one end by a screw, *m*, and at the opposite end by a staple, *m'*. Against the back of this spring H works a thumb-screw, *n*, which presses on the spring H and throws the slat forward, thus normally increasing or diminishing the amount of fertilizing material which will pass from the hopper or box between said board and the cylinder. This spring also allows the board to move backward toward the set-screw, so as to permit large pieces to be forced beyond the same without clogging the distributing mechanism.

To the opposite side of the receptacle is attached an inclined board, L, which is secured thereto by means of screws *s*, and the inclination of said board may be varied.

*r* represents a slat having an inclined edge, which may be attached to the box and adjusted so as to lie adjacent to the cylinder which feeds the fertilizer from the hopper.

The boards K L, when a cylinder with projecting teeth, as shown in Figs. 1 and 3, is employed, are provided with notches or grooves through which the teeth may pass. The teeth of the said cylinder are indicated by the letters *o o*, and said teeth will pulverize coarse substances by drawing the same through the recesses or slots *q* in the boards K L.

If desirable, when distributing fertilizers or pulverized material, a cylinder, as shown in Fig. 4, having longitudinal grooves *p p*, may be employed, and the beveled-edge slat *r* is used when this form of cylinder is attached to the machine.

The machine hereinbefore described is attached to the wagon-box or cart-body by supporting-bars *t t*, which are bent, as shown, and are adapted to be fastened to the bottom of the wagon-box with screws. The other ends of the supporting-bars are bent upwardly and inwardly, so that their ends may rest upon the bottom of the wagon-box, where they may be also fastened with screws. The bars are attached to the frame by means of screws *v v*.

The operation of my invention is as follows: When the cart or wagon is drawn forward, the rotary movement of the wheel G will be imparted to the pulley E, and is communicated by means of the chain F to the pulley *c*, thus causing the cylinder B to be rotated, which cylinder in turn imparts a rapid rotary motion to the distributer or fine-toothed cylinder D, which will still further separate the fertilizing material. By providing the upper portion, I, of the hopper with an adjustable front end the same may be attached to wagon-bodies of different widths.

I claim—

1. The side boards C C and adjustable open side boards *e*, in combination with the frame A, whereby the frame can be adjusted to different wagons, as set forth.

2. In a fertilizer-distributer, a receptacle adapted to be secured to a wagon-body of ordinary construction, consisting of a box, A, having a superstructure with adjustable end boards located above the bottom board of the wagon, inclined boards attached to the box so as to converge toward each other, a rotary cylinder driven from the wheel of the wagon, and a rapidly-rotating cylinder located and geared near the feeding-cylinder, the parts being combined and organized substantially as shown.

3. In combination with a wagon or cart, a fertilizer-distributer having means for attaching the same to the end of the wagon-body, the forward end board of the hopper being adjustable, so that the opening into the hopper and the wagon-body will be substantially the same width, the parts being constructed and combined substantially as shown, and for the purpose set forth.

4. In a fertilizer-distributer, the receptacle A, having journaled therein a rotary cylinder, B, and adjacent thereto a rapidly-rotating cylinder with projecting fingers, and inclined bottom board rigidly secured to the side of the receptacle, and a pivoted bottom board having a spring, H, against which bears a set-screw, *n*, the parts being combined and organized substantially as shown, and for the purpose set forth.

5. In a fertilizer-distributer, the receptacle A, detachably connected to a wagon-body of ordinary construction and provided with a rotary feeding-cylinder, the outer end of the shaft of which is provided with a pulley, *c*, a pulley, E, rigidly mounted on the hub of the supporting-wheel and attached to the spokes thereof by means of hooks K', and drive-chain F, the parts being organized substantially as set forth.

In testimony whereof I affix my signature in the presence of two witnesses.

JOHN RUSSELL ANTHONY.

Witnesses:

JOHN HOOVER,

C. E. BEEMAN.